United States Patent
Rousu et al.

(10) Patent No.: US 6,503,369 B2
(45) Date of Patent: Jan. 7, 2003

(54) PROCESS FOR PRODUCING CELLULOSE AND FERTILIZER BY-PRODUCT

(75) Inventors: Pasi P. Rousu, Oulu (FI); Päivi P. Rousu, Oulu (FI); Esa J. Rousu, Oulu (FI)

(73) Assignee: Chempolis Oy, Oulu (FI)

(*) Notice: Subject to any disclaimer, the term of this patent is extended or adjusted under 35 U.S.C. 154(b) by 0 days.

(21) Appl. No.: 09/969,616

(22) Filed: Oct. 3, 2001

(65) Prior Publication Data

US 2002/0069983 A1 Jun. 13, 2002

Related U.S. Application Data

(63) Continuation of application No. PCT/FI00/00292, filed on Apr. 6, 2000.

(30) Foreign Application Priority Data

Apr. 6, 1999 (FI) ................................................ 990755

(51) Int. Cl.[7] ............................................... D21C 11/00
(52) U.S. Cl. ..................... 162/29; 162/30.1; 162/30.11; 162/90
(58) Field of Search ............................ 162/4, 29, 30.1, 162/30.11, 90, 99, 97, DIG. 8

(56) References Cited

U.S. PATENT DOCUMENTS

| 4,735,683 A | * | 4/1988 | Wong et al. ................... 162/14 |
| 5,306,392 A | | 4/1994 | Mita |

FOREIGN PATENT DOCUMENTS

| GB | 761356 | 11/1956 |
| JP | 3295883 | 12/1991 |
| JP | 3295884 | 12/1991 |
| SU | 730914 | 4/1980 |
| SU | 2584205 | * 7/1980 |
| WO | WO 95/21959 A1 | 8/1995 |
| WO | WO 97/26403 | * 7/1997 |

OTHER PUBLICATIONS

Copy of Finnish Office Action, Finnish Patent Appl. No. 990755, dated Nov. 12, 1999.

Kazuhiko Sameshima and Yoshito Ohtani; What should be done between Forestry and Agriculture? A Need for Research and Development on Kenaf as a new Model.; The 8th International Symposium of Wood and Pulping Chemistry, Jun. 6–9, 1995, Helsinki Finland, Proceedings; pp. 273–276; vol. III.

Alfred Wong, Dixon NG, Jerry Hull, and W.J. Frederick, Jr.; Potassium–Based Pulping of Wheat Straw; 1989 Pulping Conference; pp. 477–479; Tappi Proceedings.

Dietrich Meier, Virgilio Zuniga–Partida, Felipe Ramirez –Cano, Niles–Casjen Hahn and Oskar Faix; Conversion of Technical Lignins Into Slow–Release Nitrogenous Fertilizers By Ammoxidation In Liquid Phase; Bioresource Technology; 1994; pp. 121–128; vol. 4; Elsevier Science Limited, Great Britain.

* cited by examiner

*Primary Examiner*—Dean T. Nguyen
(74) *Attorney, Agent, or Firm*—Alston & Bird LLP

(57) ABSTRACT

The invention relates to a process for producing cellulose and a fertilizer by-product by using a closed cycle of cooking chemicals and process waters. In the process of the invention, the pulp is bleached by at least partly using potassium hydroxide as a bleaching chemical. Thus, a bleach concentrate rich in potassium is obtained from the bleach filtrate, which bleach concentrate is combined with ashes obtained from the burning of lignin and other organic matter recovered from pulp production as a by-product, in order to be used as a potash fertilizer. The bleach-concentrate can also be used as a potash fertilizer as such. The invention also relates to a potash fertilizer obtained this way.

12 Claims, No Drawings

PROCESS FOR PRODUCING CELLULOSE AND FERTILIZER BY-PRODUCT

CROSS-REFERENCE TO RELATED APPLICATION

This application is a Continuation of International Application PCT/F100/00292 filed Apr. 6, 2000 which designated the U.S. and was published under PCT Article 21(2) in English, and which is incorporated herein by reference.

BACKGROUND OF THE INVENTION

The invention concerns production of cellulose. In particular, the invention relates to such a process for producing cellulose in which process waters can be completely recycled and cooking and bleaching chemicals can either be recycled or utilized as commercial products. Also lignin and other organic matter obtained from pulp production as a by-product can be utilized. The invention also relates to a by-product obtained from the process, the by-product being useful as a fertilizer, especially as a potash fertilizer. The invention further relates to production of a fertilizer.

A complete circulation of chemicals and process waters of a cellulose process has not yet succeeded. The reasons have been both economical and technical. Although many partial solutions have been taken into use, pulp mill bleach waters must, however, still be treated separately by an activated sludge process, for example, before they are led to water systems. Water consumption is still relatively high in the cellulose and paper industries.

The economical water use is particularly difficult in alkaline strawpulp processes, since silicon compounds of plants complicate the recovery of chemicals and cause big environmental problems.

Finnish Patent 960275 describes a process for pulp production based on formic acid, in which process a closed chemical and water cycle is implemented. Formic acid is used as a cooking chemical and the pulp is bleached by an alkaline peroxide process (NaOH is used as alkali). Nutrients are recovered from power plant ashes and silicate compounds are separated from bleach waters as sodium silicate, which is a versatile product in the chemical industry. The markets of the sodium silicate are, however, limited.

Potassium is one of the basic nutrients of fertilizers. Plants need potassium for various reasons. It participates in many functions of plants e.g. by controlling the water economy of plants, delivering other substances necessary for photosynthesis and participating in protein production and by functioning as an enzyme activator.

The utilization of by-products obtained from pulp production for fertilizing purposes, for example, has been suggested by many. The publication Meier D. et. al., Conversion of Technical Lignins into Slow-release Nitrogenous Fertilizers by Ammoxidation in Liquid Phase, Bioresource Technology 49 (1994), 121–128 has described the utilization of residual lignin obtained as a wood processing industry by-product in slow-release fertilizers.

It has also been suggested that potassium compounds used in potassium-based pulping processes would be recovered and utilized as fertilizers. For example, the publication Wong, A. et. al., Potassium-based Pulping of Wheat Straw, TAPPI Pulping Conference, 1989, p. 477–479 describes a potassium-based sulphite cooking process, which can be applied to agricultural wastes. The publication also suggests that spent liquor would be used directly in liquid form as a potassium-sulphur fertilizer containing organic matter of arable land. Used as liquid, a considerable amount of nutrients will not be used by plants, but the nutrients are easily leached from fields and may get into ground water. In addition, the energy value of cooking liquor is lost by delivering lignin and other organic substances with the cooking liquor to fields. Further, a drawback of the process is its poor usability. Storage of diluted liquid fertilizers is difficult, since the fertilizer use is seasonal.

The publication Sameshima, K. & Ohtani, Y., What should be done between Forestry and Agriculture? A Need for Research and Development on Kenaf as a new Model, TAPPI Pulping Conference 1995, p. 273–276 suggests that if alkaline hydrogen peroxide pulping were performed by using KOH, the formed waste material could be utilized as a potassium fertilizer and the ammonium oxalate could be used as a nitrogen fertilizer. The publication does not include a more specific description of waste material treatment into a potassium fertilizer.

The prior art has not described a process, however, in which all cooking chemicals used in pulping would be regenerated and the waste material formed as a by-product would be efficiently utilized either for energy production or as a fertilizer at the same time as the bleaching chemicals are utilized and the bleach waters are recycled.

BRIEF DESCRIPTION OF THE INVENTION

The invention is based on the idea that sodium hydroxide to be used in alkaline pulp bleaching is at least partly replaced with potassium hydroxide, whereby a bleach water concentrate rich in potassium is obtained from the bleach water treatment. This concentrate is then combined with ashes obtained from the burning of lignin and other organic matter recovered from pulp production as a by-product, in order to be used as raw material for a potash fertilizer. The bleach water concentrate can also be used as such as raw material for a potash fertilizer.

In the process of the invention, organic compounds dissolved during cooking are utilized in energy production (the burning of lignin) in a mill power plant, and the power plant ashes and bleaching chemicals are utilized in the fertilizer production. The bleach waters are also completely recycled.

DETAILED DESCRIPTION OF THE INVENTION

The invention relates to a process for producing cellulose and a fertilizer by-product by using a closed cycle of cooking chemicals and process waters, which process comprises (1) cellulose cooking, washing and bleaching, the bleaching comprising alkaline stages, (2) recovery of cooking chemicals and wash waters as well as lignin and other organic matter formed as a by-product in pulp production, (3) recycling of the recovered cooking chemicals and process waters, and (4) burning of the recovered lignin and other organic matter recovered from pulp production as a by-product.

The process is characterized by (i) at least partly using potassium hydroxide as alkali in the bleaching, (ii) separating the used bleach liquor into an aqueous fraction and a potassium-containing bleach concentrate, (iii) returning the aqueous fraction to the bleaching and (iv) recovering the potassium-containing bleach concentrate to be used as raw material for a potash fertilizer.

In an alternative embodiment of the invention, in step (iv) the potassium-containing bleach concentrate is mixed with ashes obtained from the burning of lignin and possibly other organic matter recovered from pulp production as a by-product, in order to be used as raw material for a potash fertilizer.

The process of the invention comprises cooking, washing and bleaching stages known per se. A bleaching sequence comprising alkaline stages is used in the process. Cooking chemicals and wash waters are recovered in manners known per se and they are recycled into the cooking and washing stage. A lignin fraction, which may also contain other organic substances and which is recovered from the cooking and washing stage, is led to a biopower plant of the pulp mill to be burnt. Organic waste obtained from the pretreatment of cellulose raw material, e.g. from straw screening, is also typically led to the biopower plant. The biopower plant produces energy, which is typically utilized as steam in the process, and an ash fraction. In the process of the invention, the ash is utilized in fertilizer production.

A bleaching sequence comprising alkaline stages is used in the process of the invention. The bleaching is typically an alkaline hydrogen peroxide bleaching. Before the peroxide stage, the bleaching sequence can further comprise an oxygen stage, an ozone stage (pH=1.5 to 3) or a peracetic acid stage (pH=1.5 to 7).

The process of the invention is characterized by replacing sodium hydroxide generally used at the alkaline stages of the bleaching either entirely or partly with potassium hydroxide (step i). Potassium hydroxide can also be used to increase pH before the bleaching. When potassium hydroxide is used instead of sodium hydroxide to increase pH or as a bleaching chemical, a potassium-containing concentrate containing a lot of potash nutrients required by plants is obtained from the fractionation of the bleach liquor.

Besides potassium hydroxide, other potassium compounds can be used as well.

It is, however, appropriate to use sodium hydroxide partially, for example in cases where one wants to provide a fertilizer intended for sugar plants, since sodium, when used in suitable proportions, improves sugar yield. A suitable potassium/sodium ratio is 3:1, for example. Sodium has also a positive effect on feed digestion.

Besides potassium, also magnesium compounds can be used in the bleaching, since magnesium compounds, too, have nutrient value When used as fertilizers. Magnesium is a substance which forms chlorophyll, and it affects the amount of crop. It also functions as an activator of many enzymes.

The most common way to use magnesium compounds in pulp bleaching is to use magnesium sulphate as a stabilizer. Magnesium can also be used before the bleaching to increase the pH of the acidic pulp with $Mg(OH)_2$. At the same time it acts as a stabilizer at oxygen-based bleaching stages, such as hydrogen peroxide and peracetic bleachings.

Besides potassium and magnesium compounds, $NO_2$, for example, can also be used as an activator of bleaching, whereby the nutrient value of the fertilizer increases in regard to nitrogen.

The process of the invention is also characterized by separating the used bleach liquor after the bleaching into an aqueous fraction and a potassium-containing bleach concentrate in step (ii). The separation is typically performed by first filtering and then evaporating, typically by vacuum evaporation. The evaporation can have one or more stages. The pH of the evaporation is typically 7 to 13, preferably 9 to 11.

In the concentration of the bleach filtrate, the silicon content acts as a restricting factor in that the maximum dry substance content is determined according to the silicon content. Problems usually arise when the silicon content in the concentrate increases to a range of 1 to 1.5%. However, poorly soluble silicate compounds are not formed in the bleaching, since the acidic cooking conditions remove the metal compounds from the pulp and the bleaching is kept in alkaline conditions in an area in which silicon is in a soluble form. This happens in normal alkaline oxygen-based bleaching systems. When the temperature rises, the solubility of silicon is improved and the viscosity is lowered. In the next step (iv), i.e. when the sludge is cooled and possibly mixed with ash, crystallisation occurs, which can be utilized in the granulation.

If required, the amount of water in the evaporation concentrate can, however, be still decreased by reducing pH, for example, whereby the silicates are precipitated and the desired nutrients, such as potassium, remain in the silicate precipitate. Thus, more water is obtained for recycling and the water content of the concentrate going to the fertilizer production is reduced. The silicate precipitation is typically performed by regulating pH to be 8, for example, by adding acid, such as formic acid or carbon dioxide, whereby silicon and all other useful nutrients with it are precipitated almost completely. The precipitate is separated by centrifuging, for example. Thus, a precipitate is obtained (centrifugation cake), which is used according to the invention for the fertilizer production.

The centrifugation supernatant, which no longer contains silicon, can be led to another evaporation stage (multistage evaporation), whereby the concentration can be done by using a higher dry substance content. Thus, more potassium and other nutrients are obtained from the concentrate to the fertilizer.

Thus, the number of evaporation stages mainly depends on the amount of silicon in the raw material. When the silicon content is low, one concentration stage (one evaporation) is enough, whereas when the silicon content is high, more concentration stages are possibly required.

A bleach concentrate is obtained, whose dry substance content is typically between 5 and 50%. The dry substance content depends on the used raw material and the number of concentration stages.

The aqueous fraction, i.e. the water separated in the filtration and evaporated, which is obtained in step (ii) is returned to the washing of the bleached pulp (step iii).

In step (iv) of the process of the invention, the potassium-containing bleach concentrate is recovered to be used as raw material for a potash fertilizer.

In step (iv) of the alternative embodiment of the process of the invention, the potassium-containing bleach concentrate obtained this way is mixed with ashes obtained from the burning of lignin and possibly other organic matter as well. Thus, potassium, magnesium and other such nutrients can be utilized as fertilizers together with ashes obtained from the burning of lignin and other organic matter.

Said ash fraction contains nutrients (K, Ca, P, Mg, Fe and other acid-soluble components) which have been separated during the cooking to the cooking liquor and further during the recovery of formic acid which has acted as a cooking chemical to the organic matter (to the lignin-hemicellulose fraction). When burning this lignin-hemicellulose fraction, the nutrients remain in the ashes of the power plant. The ashes may also contain an ash component obtained from burning cellulose raw material, such as straw screenings.

Bio-based ash that is formed in other energy production can also be used in the process. This kind of ash may be derived for example from a conventional pulp mill plant producing additional energy, in which plant barks of trees and corresponding waste material, for example, are burnt.

The final potash fertilizer product is produced such that the potassium-containing bleach concentrate obtained from step (iv) or alternatively a composition, which contains ashes obtained from the burning of lignin and possibly other organic matter that is recovered from cellulose production as a by-product, is brought to a solid form. This can be performed by granulating or drying, for instance.

The metal compounds of the ashes precipitate the silicate compounds in the bleach concentrate and, together with the residual lignin of the bleach concentrate and the hemicellulose, they form a composition that can easily be granulated to a fertilizer use. The silicates and lignin both act as binding agents.

Thus, the invention also relates to a process for producing a potash fertilizer, which process is characterized by mixing the potassium-containing bleach concentrate obtained from the pulp bleach filtrate with ashes which are obtained from the burning of lignin and possibly other organic matter recovered from pulp production as a by-product, and bringing the mixture to a solid form. Alternatively, the bleach concentrate obtained from the pulp bleach filtrate can be brought to a solid form as such. This can be performed by granulating or drying, for instance.

The invention also relates to a potash fertilizer produced this way.

The new potash fertilizer of the invention is alkaline and it increases the pH of the soil, thereby improving the possibilities of plants of taking nutrients from the soil. The fertilizer of the invention also contains lignin and hemicellulose and fines and rejects. They bring the required organic matter to the soil for the nutrition of microbes.

In strawpulp production, by means of the process of the invention the nutrients coming to the pulp mill along with straw can be collected for utilization and the nutrient value of the fertilizer is improved by the chemicals that are used in the bleaching. The process saves nature, since the whole plant can be used with so few emissions as possible. Cellulose, energy, chemicals (e.g. acetic acid) and fertilizers are produced from agricultural residues.

Surprisingly, it was observed in accordance with the invention that the potassium compounds that are used only in the alkaline bleaching are sufficient to meet the cultivation demand corresponding to the cellulose production and chlorine-free fertilizers can further be utilized to meet the substituting demand. Granulated fertilizers are more friendly to environment and save the fertilizer transportation costs when compared to the above method of Wong et. al., for example, in which pulp mill spent liquors containing potassium are led to fields as such. In addition, the closed bleach water cycle of the process of the invention saves the consumption of process waters. Also when it comes to energy economics, the process of the invention is advantageous, since lignin can be utilized as energy and the chemical costs of potassium are lower.

In the best case, the potash fertilizer obtained from the process of the invention contains potassium about 40% (expressed as $K_2O$). The $K_2O$ content of a potash fertilizer is typically 5 to 40%. Without the closed water cycle of the bleaching, the potash content of the mere power plant ashes is only about 5%. A 50 000 t/a pulp mill, for example, produces 7000 t/a of potash fertilizer. It corresponds to a potash fertilizer demand of 70 000 hectares. From this kind of an area, 280 000 t/a of wheat straw and over 100 000 t/a of pulp are obtained.

Depending on the nutrient demand of the soil, the above described fertilizer can be improved by adding phosphor and nitrogen compounds, for example, in the granulation of the fertilizer or in the silicate precipitation. This can be done by using for example nitric acid, phosphoric acid, ammonium compounds and/or their salts.

The process of the invention is particularly applicable to pulp production processes based on formic acid, in which processes herbaceous plants and corresponding non-wood fibre sources have been used as raw material. The most important fibre sources are straw, typically corn straw (wheat, rye, oats, barley, rice), grasses, e.g. esparto grass, sabai grass and lemon grass, reeds, such as papyrus, common reed, sugar cane, or bagasse, and bamboo, bast fibres, e.g. stems of fibre flax or seed flax, kenaf, jute and hemp, leaf fibres, e.g. manilla hemp and sisal, and seed hairs, such as cotton and cotton linter fibres.

Useful grasses that grow in Finland are e.g. common reed, reed canary grass, tall fescue and timothy.

The process of the invention can also be applied to wood material. The invention applies not only to processes based on formic acid but also to pulp production processes using also other organic and/or inorganic solvents and to traditional kraft and soda processes.

The following examples illustrate the present invention.

EXAMPLE 1

Reed canary grass cellulose produced by a process based on formic acid was bleached by an alkaline hydrogen peroxide bleaching using KOH in the pH regulation. KOH was used 8.4% of the amount of dry pulp and hydrogen peroxide was used 3%. The bleaching temperature was 90° C. The bleaching time was 1.5 h, during which the hydrogen peroxide was used up and the pH had decreased from 12.5 to 11.0. The bleach yield was 86%. The bleach filtrate was concentrated by means of a vacuum evaporator at pH 10.5. The dry substance content of the resultant concentrate was 6%, from which 70% was ash.

The concentrate obtained this way was dried as a potash fertilizer. The composition of the resultant dry fertilizer was as follows: 30% of organic matter, $SiO_2=33\%$, $K_2O=27\%$ and 10% of other substances.

EXAMPLE 2

The production and bleaching of cellulose was performed in a similar manner as in the example 1, except that KOH was used in the following proportions: 9.8%, 11.2% and 12.6% of the amount of dry pulp. When the bleaching time was 1.5 hours, the bleach yields were 86%, 82% and 82% respectively and the viscosities were 800 $dm^3$/kg, 780 $dm^3$/kg and 780 $dm^3$/kg.

In addition, comparison tests were carried out, using, instead of KOH, the corresponding amount of NaOH expressed as molar ratio in the bleaching. The following quantities of NaOH were used: 7%, 8% and 9%. The bleaching results were almost identical (for example, when using 7% of NaOH and the bleaching time of 1.5 hours, the bleach yield was 86% and the pulp viscosity 820 $dm^3$/kg. Thus no differences were apparent in the bleaching. It can be stated that the use of potassium hydroxide did not weaken the viscosity values of the resultant pulp. When using both NaOH and KOH, the suitability of the resultant pulp for paper production was equally good.

EXAMPLE 3

In the production of cellulose based on formic acid, reed canary grass was used, whose ash had a nutrient content of Fe=0.24%, K=3.5%, Ca=0.11%, Mn=0.35%, Cu=0.01%, Mg=1.37% and Na=0.04%. The nutrient content of the ash obtained from the burning of the resultant cooking liquor (the recovered lignin fraction) was Fe=0.29%, K=9.48%, Ca=8.87%, Mn=0.62%, Cu=0.02%, Mg=3.54% and Na=0.66%. This ash was mixed with the bleach liquor concentrate, which was obtained in the manner described in the example 1.

A sample was taken from the mixture, the sample being dried in the oven and air-conditioned at a temperature of 23° C. and in a relative humidity of 50%. After the air-conditioning, the dry substance content of the sample was 99.4%. According to a trace element analysis, the proportion of potassium was 23% and the amount of silicates 68%. Other measured components were Ca=4.9%, Mg=1.5%, Na=1.6%, Mn=0.8%, Fe=0.14% and Cu=0.02%.

It was established that the nutrient values were suitable for a potash fertilizer.

It is obvious to a person skilled in the art that as technology develops, the basic idea of the invention can be implemented in a variety of ways. Thus, the invention and the embodiments thereof are not restricted to the above examples, but they may vary in the scope of the claims.

What is claimed is:

1. A process for producing cellulose and a fertilizer by-product by using a closed cycle of cooking chemicals and process waters, which process comprises
    (1) cellulose cooking using a process based on formic acid and/or other organic solvents, cellulose washing and bleaching based on hydrogen peroxide bleaching with alkaline stages,
    (2) recovery of cooking chemicals and wash waters as well as lignin and other organic matter formed as a by-product in pulp production,
    (3) recycling of the recovered cooking chemicals and process waters, and
    (4) burning of the recovered lignin and other organic matter recovered from pulp production as a by-product, which process further comprises
        (i) at least partly using potassium hydroxide as alkali in the bleaching,
        (ii) separating the used bleach liquor into an aqueous fraction and a potassium-containing bleach concentrate,
        (iii) returning the aqueous fraction to the bleaching and
        (iv) mixing the potassium-containing bleach concentrate obtained from step (ii) with ashes obtained from the burning of lignin and possibly other organic matter recovered from pulp production as a by-product obtained from step (4), in order to be used as raw material for a potash fertilizer.

2. A process as claimed in claim 1, wherein the bleaching comprises such an alkaline bleaching in which potassium compounds are used to increase pH or as a bleaching chemical.

3. A process as claimed in claims 1 or 2, wherein the separation of the bleach liquor into an aqueous fraction and a potassium-containing bleach concentrate is carried out by filtering and evaporating.

4. A process as claimed in claims 1 or 2, wherein the separation of the bleach liquor into an aqueous fraction and a potassium-containing bleach concentrate is carried out by filtering and evaporating and the solid matter is precipitated and separated after the evaporation.

5. A process as claimed in claim 1, wherein magnesium compounds and/or other potassium compounds are additionally used in the bleaching.

6. A process as claimed in claim 1, wherein the dry substance content of the bleach concentrate obtained from step (ii) is 5 to 50%.

7. A process as claimed in claim 1, wherein the mixture obtained from step (iv) is brought to a solid form to produce a potash fertilizer.

8. A process as claimed in claim 7, wherein the mixture is brought to a solid form by granulating and drying.

9. A potash fertilizer produced by the process of claim 7.

10. A potash fertilizer produced by the process of claim 8.

11. A potash fertilizer as claimed in claim 9 or 10, wherein the potassium content is 5to 40% (calculated as $K_2O$).

12. A process as claimed in claim 1, wherein step (iv) further comprises mixing the potassium-containing bleach concentrate obtained from step (ii) with ashes obtained from the burning of lignin and other organic matter removed from pulp production as a by-product from step (4).

* * * * *